United States Patent [19]

Schnitzler

[11] 4,190,257

[45] Feb. 26, 1980

[54] PACKING RING CONTAINING FLEXIBLE GRAPHITE

[75] Inventor: Danny L. Schnitzler, Port Clinton, Ohio

[73] Assignee: Union Carbide Corporation, New York, N.Y.

[21] Appl. No.: 874,368

[22] Filed: Feb. 1, 1978

[51] Int. Cl.$^2$ .................... F16J 15/20; F16J 15/30
[52] U.S. Cl. ..................... 277/102; 277/DIG. 6
[58] Field of Search ......... 277/DIG. 6, 102, 227–234, 277/123, 124, 125, 96.2, 166

[56] References Cited

U.S. PATENT DOCUMENTS

| | | | |
|---|---|---|---|
| 3,404,601 | 10/1968 | Shane et al. | 428/143 |
| 3,841,289 | 2/1973 | Meyers | 277/233 |
| 4,068,853 | 1/1978 | Schnitzler | 277/102 |

OTHER PUBLICATIONS

Bulletin TP2-175A, "Thermal Pak TP2 Expansion Joints," Advanced Thermal System Inc., Aug. 1977.

*Primary Examiner*—Robert I. Smith
*Attorney, Agent, or Firm*—J. Hart Evans

[57] ABSTRACT

A reformable packing ring comprising compressed particles of flexible graphite. Such packing ring can be used to pack the stuffing box assembly of any pump, valve, or like structure. Because such packing ring undergoes considerable flow when subjected to pressure, it is capable of forming a better interference fit within the stuffing box than presently employed packing rings. As a result of this ability to flow and reform its dimensions under pressure, such packing ring need not be sized as precisely to the dimensions of a particular stuffing box as presently employed rings.

15 Claims, No Drawings

PACKING RING CONTAINING FLEXIBLE GRAPHITE

BACKGROUND OF THE INVENTION

This invention relates to the formation of more efficient seals in the stuffing box assembly of pumps and valves, and like structures, through the use of a reformable packing ring comprising compressed particles of flexible graphite.

Flexible graphite has long been employed as a packing material to form very efficient seals for the stuffing box assembly of pumps, valves, and like structures. One form such flexible graphite has taken is that of preshaped lamellar rings. Another form is die molded rings formed by compressing a corrugated ribbon or tape of flexible graphite which has been wrapped about a shaft. In any event, in order for such preshaped rings to be effective, they must form an exact interference fit between the stuffing box and the stem of the pump or valve, or be capable of expanding and filling this space when pressure is applied by the tightening of the gland of the stuffing box. Unfortunately, however, lamellar packing rings, because of their highly anisotropic structure, do not undergo any significant amount of lateral flow when pressure is applied to them and hence often fail to form the desired interference fit between the stuffing box and stem of the pump or valve. Likewise, the die molded rings undergo an average expansion of only about 4 percent in their outer diameters before permanent impairment of the sealing surfaces of such rings occur, and also often fail to provide a satisfactory seal.

SUMMARY OF THE INVENTION

The present invention provides a highly efficient packing ring comprising compressed particles of flexible graphite. Because such packing ring is highly isotropic compared to the packing rings presently in use, it undergoes greater flow than presently used rings when subjected to pressure, such as is produced by tightening the gland of a stuffing box. As a result, a better interference fit can be produced within the stuffing box and a more efficient seal created. Because of the ability of this packing ring to flow and reform its dimensions, it need not be sized as precisely to the dimensions of a particular stuffing box as the rings heretofore employed.

DESCRIPTION OF THE PREFERRED EMBODIMENTS

Conventional preshaped rings of lamellar flexible graphite sheet, as aforementioned, are highly anisotropic with the basal planes of the graphite lying essentially in the same plane as the ring. As pressure is applied to such rings by the gland of a stuffing box and the ring is compressed perpendicular to the basal planes, very little lateral flow takes place in the direction of the basal planes.

In the case of rings formed by compressing a corrugated ribbon or tape of flexible graphite which has been wrapped about a shaft, the basal planes of the graphite at first lie parallel to the shaft as the ribbon or tape is wrapped about the shaft, and then at a given angle to the shaft after compression. As a result, when such rings are further compressed by the gland of a stuffing box, they undergo a limited amount of lateral flow as the basal planes thereof are pushed further in a direction parallel to the planes of the rings. However, the outer diameters of such rings have been found to expand an average of only about 4 percent before permanent impairment of the sealing surfaces of such rings occurs.

The packing ring of the present invention, on the other hand, is formed from small randomly oriented particles compressed together, and hence is highly isotropic in nature. When pressure is applied to such ring by the gland of a stuffing box, these small randomly oriented particles undergo flow with respect to each other, causing the ring to reform its shape to the dimensions of the stuffing box. As a result, a tight interference fit is produced within the stuffing box and a more efficient seal is created.

Not only does the isotropic structure of the packing ring of the present invention impart better sealing capabilities to said ring, but such structure also renders such packing ring ideally suited for valve stem seals where low friction is a necessary consideration. Thus, the packing ring of the present invention has not only been found to produce a leak-proof seal when employed with both gaseous and liquid fluids, but also to exhibit a surprisingly low stem friction as compared to other packing rings formed from flexible graphite. By stem friction as used herein is meant the frictional drag on the valve stem measured in terms of the difference in force required to operate the valve when the stuffing box is packed versus the force required to operate the valve when there is no packing in the stuffing box.

The packing rings of the present invention can be prepared by compressing particles of flexible graphite in a molding die having a shape conforming to that of the desired ring. Rings of any desired size can be produced in this manner. The density of such rings will vary in proportion to the amount of pressure applied. As a practical matter, rings having a density lower than 70 lbs./ft.$^3$ do not hold together well, and rings having a density in excess of 120 lbs./ft.$^3$ are not only difficult to fabricate but require high pressure during use to cause them to reform to the dimensions of the stuffing box. Rings having such densities can be produced by applying a molding pressure of from about 1500 psi. to about 12,000 psi. upon the flexible graphite particles. Pressures of from about 2000 psi. to about 3000 psi. produce rings having a density of from about 80 lbs./ft.$^3$ to about 90 lbs./ft.$^3$ Such rings are satisfactory for most applications.

When the packing ring produced in this manner is installed in the stuffing box of a pump or valve and the gland of the pump or valve is tightened, the ring will be compressed and will reform its shape so as to fill the space between the walls of the stuffing box and the stem of the pump or valve. The gland should be tightened sufficiently to cause the ring to fill the stuffing box so that it will seal off the internal fluid pressure of the pump or valve.

The flexible graphite particles employed in the production of the packing rings of the present invention can vary in length up to about 1 inch, but are usually no greater than 0.250 inch in length. Although particles small enough to pass through a No. 30 U.S. Standard sieve (0.0234 inch opening) can be employed, such particles are less desirable than somewhat larger particles because they are prone to slip-extrude past part interfaces of the stuffing box (part interface tolerances in excess of 0.005 inch are not uncommon). For this reason, it is generally preferred to employ particles large enough to be retained on a No. 30 U.S. Standard sieve.

In applications where part tolerances are less than 0.005 inch, however, smaller particles can be employed, provided they are large enough to be retained on a No. 50 U.S. Standard sieve (0.0117 inch opening).

The flexible graphite particles employed in the present invention can be prepared by shredding flexible graphite sheet. Such sheet can be prepared, as is well known, by expanding graphite flakes by a factor of at least 80 times in the "c" crystallographic axis direction, and then compressing the expanded flakes to form a cohesive structure. The expansion of graphite flakes can readily be achieved by attacking the bonding forces between layer planes in the internal structure of the graphite. The result of such an attack is that the spacing between the superposed layers can be increased so as to effect a marked expansion in the direction perpendicular to the layers which is the "c" axis direction. The expanded particles can be formed under a slight pressure into a foam material since the particles have the ability to adhere without a binder due to the large expansion. Tapes, sheets and the like are formed from the expanded particles by simply increasing the compressive pressure, the density of the formed graphite being related to the applied formation pressure. Densities of less than 5 pounds per cubic foot to about 137 pounds per cubic foot are readily obtained for this material. A full description of the method of making flexible graphite can be found in U.S. Pat. No. 3,404,061, issued on Oct. 1, 1968.

The flexible graphite sheet employed to produce the flexible graphite particles employed in the present invention preferably has a density of from about 10 lbs./ft.$^3$ to about 100 lbs./ft.$^3$, most preferably from about 50 lbs./ft.$^3$ to about 90 lbs./ft.$^3$, and a thickness of from about 0.003 inch to about 0.060 inch, preferably from about 0.005 inch to about 0.025 inch. If desired, the flexible graphite particles may be obtained by shredding material produced by expanding graphite flakes and compressing the expanded flakes into shapes having greater thicknesses than is characteristic of sheet, e.g., blocks and the like.

If desired, other materials such as phenolic resins, carbon fibers, and the like, may be added to the flexible graphite packing rings of the present invention to act as binders, reinforcement, etc.

The following examples are set forth for purposes of illustration so that those skilled in the art may better understand the invention. It should be understood that they are exemplary only, and should not be construed as limiting the invention in any manner.

EXAMPLE 1

A sheet of "Grafoil"* grade GTB flexible graphite of 0.015 inch nominal thickness and 70 lbs./ft.$^3$ nominal density was shredded by means of a crosscut shredder. The resulting particles were generally sliver-shaped, having lengths up to ¼ inch and widths of about 1/32 inch. The edges of these particles were often curled and, when flattened, the flattened pieces had widths of about 1/16 inch to 3/32 inch.

*"Grafoil" is a registered trademark of Union Carbide Corporation.

The shredded particles were then poured into a molding die and compressed under a pressure of 2000 psi. (applied perpendicular to the plane of the ring) to produce a packing ring having an inner diameter of 7/16 inch and an outer diameter of 11/16 inch. The density of the ring was 80 lbs./ft.$^3$ The ring was then subjected to a pressure of 700 psi. to 2000 psi. (perpendicular to the plane of the ring). As a result of this pressure, the ring reformed its dimensions to fill an annular space in excess of twice the original area of the ring.

When a pressure of 2000 psi. to 3000 psi. was applied to a conventional preshaped flexible graphite lamellar ring, on the other hand, the outer diameter of the ring was found to undergo an expansion of only 0.8 percent to 1.6 percent of the original diameter while the inner diameter was found to contract only 0.3 percent.

When a ring formed by compressing a corrugated ribbon or tape of flexible graphite which had been wrapped about a shaft was subjected to a pressure of 200 psi. to 1500 psi., the outer diameter of the ring was found to undergo an expansion of 1 percent to 7 percent while the inner diameter was found to contract 1 percent to 10 percent. Expansion of the outer diameter in excess of about 4 percent, however, caused the outer wrap of the ring to tear. This tear did not close up with the application of increased pressure, leaving the ring with a possible leak path.

EXAMPLE 2

Four packing rings produced as described in Example 1 were then installed in the stuffing box of a control valve and subjected to a gland pressure sufficient to seal 1500 psi. internal pressure. The control valve was equipped with a diaphragm valve actuator by means of which the valve could be opened and closed. The actuator used air pressure to open the valve and a spring to close it. The air pressure required to open the valve could be measured by means of a manometer.

Oil, air and water were then successively passed through the valve and in each instance the valve was subjected to 5000 open and close cycles. In each instance, the value operated during this entire time completely free of leakage.

The frictional pressure required to operate the valve was measured for all three fluids after the 25th and 5000th cycle, and compared to the pressure required to operate the valve when no packing was present. The difference in pressure, known as frictional drag, was found to be 1.5 psi., 1.8 psi. and 0.6 psi. for the oil, air and water, respectively, after the 25th cycle. After the 5000th cycle, the frictional drag was found to be 0.3 psi., 1.2 psi. and 0.6 psi., respectively, for the oil, air and water.

When the same control valve was packed with four conventional preshaped flexible graphite lamellar rings and tested in the same manner while oil was passed through the valve, the difference in pressure required to operate the valve with the packing present compared to when no packing was present was found to be 3.8 psi. after the 25th cycle.

When the test was repeated with air and water using four rings formed by wrapping a corrugated ribbon or tape of flexible graphite 0.5 inch wide and 0.015 inch thick about a shaft and then compressing the ribbon or tape into a ring, the frictional drag on the valve stem in each instance was so high that the valve could not be closed even at maximum diaphragm pressure of 15 psi. In the case when air was employed, the valve operated with considerable stem chatter.

When the test was repeated again using water and four rings formed by wrapping a corrugated ribbon or tape of flexible graphite 1 inch wide and 0.015 inch thick about a shaft and then compressing the ribbon or tape into a ring, the difference in pressure required to operate the valve with the packing present compared to which no packing was present was found to be 1.7 after the 25th cycle, and 1.3 after the 5000th cycle.

What is claimed is:

1. A packing ring comprised of small randomly oriented particles of flexible graphite compressed together, said packing ring having a density of from 70 lbs./ft.$^3$ to 120 lbs./ft.$^3$, and said particles being capable of undergoing flow with respect to each other when pressure is applied to the ring so as to cause said ring to reform its shape to the dimensions of a stuffing box.

2. A packing ring as in claim 1 having a density of from 80 lbs./ft.$^3$ to 90 lbs./ft.$^3$ 3. A packing ring as in claim 1 or 2 wherein the packing ring is formed from flexible graphite particles of a size sufficient to be retained on a No. 50 U.S. Standard sieve but do not exceed 0.250 inch in length.

4. A packing ring as in claim 1 or 2 wherein the packing ring is formed from flexible graphite particles of a size sufficient to be retained on a No. 30 U.S. Standard sieve but do not exceed 0.250 inch in length.

5. A packing ring as in claim 3 wherein the flexible graphite particles employed in forming the packing ring are produced from sheet having a density of from 10 lbs./ft.$^3$ to 100 lbs./ft.$^3$ and a thickness of from 0.003 inch to 0.060 inch.

6. A packing ring as in claim 3 wherein the flexible graphite particles employed in forming the packing ring are produced from sheet having a density of from 50 lbs./ft.$^3$ to 90 lbs./ft.$^3$ and a thickness of from 0.005 inch to 0.025 inch.

7. A packing ring as in claim 4 wherein the flexible graphite particles employed in forming the packing ring are produced from sheet having a density of from 10 lbs./ft.$^3$ to 100 lbs./ft.$^3$ and a thickness of from 0.003 inch to 0.060 inch.

8. A packing ring as in claim 4 wherein the flexible graphite particles employed in forming the packing ring are produced from sheet having a density of from 50 lbs./ft.$^3$ to 90 lbs./ft.$^3$ and a thickness of from 0.005 inch to 0.025 inch.

9. In a stuffing box assembly, the improvement wherein the stuffing box is packed with a packing ring comprised of small randomly oriented particles of flexible graphite compressed together, said packing ring having the dimensions of the stuffing box as a result of pressure applied to said ring by the gland of said stuffing box.

10. A stuffing box assembly as in claim 9 wherein the packing ring is formed from flexible graphite particles of a size sufficient to be retained on a No. 50 U.S. Standard sieve but do not exceed 0.250 inch in length.

11. A stuffing box assembly as in claim 9 wherein the packing ring is formed from flexible graphite particles of a size sufficient to be retained on a No. 30 U.S. Standard sieve but do not exceed 0.250 inch in length.

12. A stuffing box assembly as in claim 10 wherein the flexible graphite particles employed in forming the packing ring are produced from sheet having a density of from 10 lbs./ft.$^3$ to 100 lbs./ft.$^3$ and a thickness of from 0.003 inch to 0.060 inch.

13. A stuffing box assembly as in claim 10 wherein the flexible graphite particles employed in forming the packing ring are produced from sheet having a density of from 50 lbs./ft.$^3$ to 90 lbs./ft.$^3$ and a thickness of from 0.005 inch to 0.025 inch.

14. A stuffing box assembly as in claim 11 wherein the flexible graphite particles employed in forming the packing ring are produced from sheet having a density of from 10 lbs./ft.$^3$ to 100 lbs./ft.$^3$ and a thickness of from 0.003 inch to 0.060 inch.

15. A stuffing box assembly as in claim 11 wherein the flexible graphite particles employed in forming the packing ring are produced from sheet having a density of from 50 lbs./ft.$^3$ to 90 lbs./ft.$^3$ and a thickness of from 0.005 inch to 0.025 inch.

* * * * *